This invention relates to microscopes and more particularly to a liquid dispensing device for oil immersion type of operation.

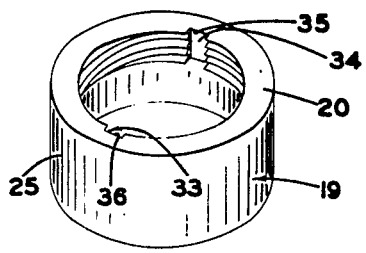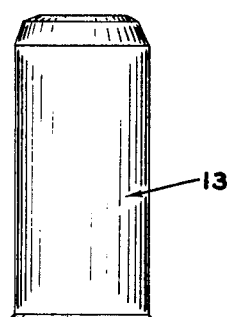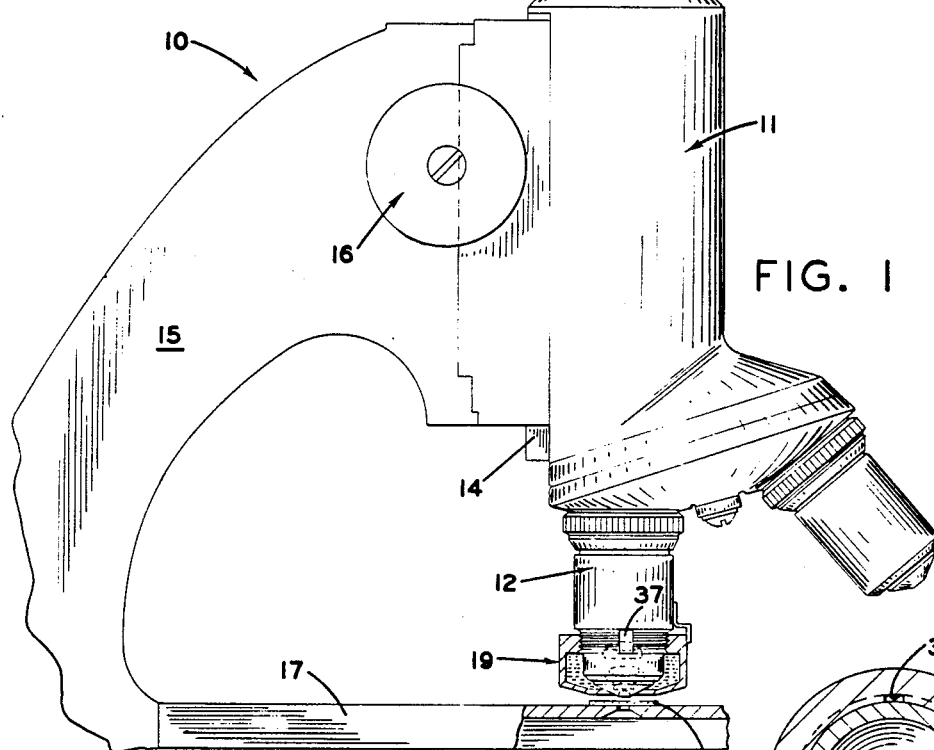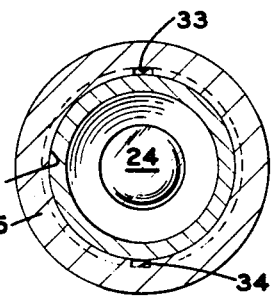
Aug. 24, 1965    S. J. BOND    3,202,049
LIQUID DISPENSER FOR MICROSCOPE OBJECTIVE
Filed Nov. 29, 1961
INVENTOR.
SELAH J. BOND
BY Frank C. Parker
ATTORNEY 3,202,049
LIQUID DISPENSER FOR MICROSCOPE
OBJECTIVE
Selah J. Bond, Ontario, N.Y., assignor to Bausch & Lomb
Incorporated, New York, N.Y., a corporation of New York
Filed Nov. 29, 1961, Ser. No. 155,713
4 Claims. (Cl. 88—40)

When using a microscope having an oil immersion type of objective, the lowest lens surface is usually plano and is located only a few thousandths of an inch away from the specimen slide so that it is often a vexing operation to insert the required oil immersion liquid between the slide and the objective making it necessary to move the objective upwardly. Furthermore, the operation is messy and time-consuming and more important, it is difficult to apply the optimum amount of oil to the slide.

It is an object of this invention to overcome the aforesaid difficulties by providing a novel liquid dispenser for the liquid required by oil immersion type of objectives, said dispenser being simple and neat in structure and operation.

It is a further object to provide such a device which is carried by and in effect forms a part of a microscope objective, the device being adjustable for dispensing said oil in accordance with its viscosity in an optimum manner, and without interfering with normal operation of the instrument.

A still further object of this invention is to provide such a device having venting means for facilitating flow of said oil, and means for showing the supply of oil.

Further objects and advantages reside in the detailed construction and combination of the parts of this invention as described and suggested in the specification herebelow taken together with the accompanying drawing, wherein:

FIG. 1 is a side elevational view partly shown in section and broken away of one form of the present invention assembled on a microscope, the device being shown in inoperative position;

FIG. 2 is an enlarged sectional view of this invention assembled in operating position on a microscope objective;

FIG. 3 is an enlarged sectional view taken on the line 3—3 of FIG. 2;

FIG. 4 is an enlarged perspective view of a part of the oil dispensing mechanism; and FIG. 5 is a sectional view of the objective casing per se.

In the drawing, the numeral 10 represents generally a microscope having an optical tube 11 whereon an oil immersion type of objective 12 is mounted in optical alignment with an eyepiece 13. The tube 11 with its associated parts is mounted for vertical movement on suitable guideways 14 formed on the microscope body 15, and movement thereof is effected by turning a suitable fine adjustment mechanism which is generally designated by numeral 16. Below the objective 12 is provided a stationary stage 17 whereon a specimen slide 18 is held.

It is well known in the art that the amount of useful illumination received by an objective of high numerical aperture may be considerably increased by adding a drop of oil of proper refractive index to the slide so as to fill the space between the specimen slide and the lowermost refractive surface of the objective.

According to this invention the placement of said drop of oil may be advantageously facilitated by the dispensing mechanism described herebelow. The dispensing mechanism is provided by the complementary structures of a liquid holding shell 19 and the aforesaid objective 12 on which the shell is supported by any preferred mechanism for relative vertical movement thereon such as a nut element 20 which is engaged with a thread element 21 on the objective.

Below the thread 21, a cylindrical surface 22 is formed on the objective casing and therebelow is formed a bottom conical surface 23 which terminates close to a central lens 24.

The liquid dispenser 19 is formed with a cylindrical wall 25 which is spaced radially from the surface 22 to form a liquid holding chamber 26. Wall 25 is joined integrally at the bottom with a somewhat conical wall 27 which closes the chamber and has a central dispensing aperture therein defined by an annular conical surface 28. The angularity of the surface 28 is intended to substantially match the angularity of the conical surface 23 on the objective so that together these contacting surfaces constitute a valve for metering the liquid as it emerges from said aperture. For best action of this device, the lowest surface 29 on the conical part 27 should be near but not below the lowest lens surface on the lens 24.

For the purpose of metering the flow of the oil from the chamber 26 at a desired rate, a suitable scale 30 is formed around the periphery on the upper part of said dispensing shell 19 and an index mark 31 is fixed on the objective 12 so that the amount of rotation of said shell is indicated whereby the area of the dispensing orifice may be varied by measured amounts.

Another novel feature of this invention is provided in the means for venting the chamber 26, said means comprising a pair of notches 33, 34 formed transversely to the thread in the nut 20. As seen in FIG. 4, said notches terminate in the flat walls 35, 36 at a position no deeper than the root of the thread, and corresponding notches 37 having bottom walls 37', as shown in FIG. 5, are provided in the male thread 21 of the objective 12. Since all of the aforesaid notches are not deeper than the thread depth, the notches provide a vent for the chamber 26 when in registry with each other. The angular locations of the notches is such that the venting passage is closed when the valve part 28 bears against conical surface 23.

A further novel feature is provided by forming the cooperating notches 33, 34, 37 at such relative angular locations that closure of the vent passages occurs somewhat before the closure of the valve parts 28, 23 whereby a slight positive pressure is applied to expel the liquid from the chamber 26 by turning the shaft 19 further until the valve is closed.

Advantageously, the dispenser shell 19 may be made of a translucent plastic material whereby the oil supply can be seen from any angle and scratching of the valve seat 23 is eliminated.

In the operation of this device, it is only necessary to fill the chamber 26 with the proper immersion liquid, adjust the focus of the objective 12 by the control knob 16, and rotate the dispenser shell 25 slightly so that a thin film of oil flows under the objective onto the specimen slide 18 as shown at 32 and then rotate the chamber reversely to reclose the valve. The objective 12 need not be racked upwardly before the oil is applied to the specimen and an optimum amount of oil may be obtained by rotating the shell 25 to the desired scale setting.

It will be observed from the foregoing that this invention provides a simple and convenient oil dispensing device which is neat and clean in operation and having a controllable oil flow, all of which is in conformity to the stated objects of this invention.

Although only one form of this invention has been shown and described in detail, other forms are possible and changes may be made in the operational details there-

What is claimed is:

1. The combination in a liquid dispenser which is mounted on an oil immersion type of microscope objective having a side wall and a bottom wall of
   a shell surrounding and spaced from said side wall and extending beneath said bottom wall of the objective to form therewith a liquid holding chamber,
   means including an inclined connection constructed jointly on the upper end of the shell and objective side wall for mounting the shell for longitudinal motion on the objective upon rotation of said shell, and
   an annular seating surface formed on the lowermost part of said shell around a central discharge orifice in said bottom wall, said seating surface being formed to fit against and cooperate with the bottom wall in one operative position of the shell to form therewith a valve for governing exit of the liquid held in said chamber.

2. The combination in a liquid dispenser which is mounted on an oil immersion type of microscope objective having a side wall and a bottom wall of
   a shell surrounding and spaced from said side wall and extending beneath said bottom wall of the objective to form therewith a liquid holding chamber,
   a thread formed on said side wall and a mating thread formed on the upper part of said shell for mounting the shell on the objective and effect relative axial motion therebetween, and
   an annular seating surface formed on the lowermost part of said shell around a central discharge orifice in said bottom wall, said seating surface being formed to fit against said bottom wall and coact therewith to close the chamber in one operative position of the shell and being displaceable axially by rotation of said shell to act as a valve in distributing a limited flow of liquid beneath said objective.

3. A liquid dispenser for a microscope as set forth in claim 2 and further comprising a surface which constitutes the bottom of a recess formed axially through each of the cooperating threaded parts of said threaded connection at a depth substantially equal to the thread depth, said shell being rotated to align the recesses so as to form a venting passage when the valve parts are in operating position but misaligned to close said passage when the shell is rotated to close the valve.

4. The combination in a liquid dispenser which is mounted on an oil immersion type microscope objective of an objective casing having a cylindrical outer portion and terminating below in a downwardly inclined conical portion which is partly used as a valve seat, a liquid holding shell spaced away from both said portions to form a reservoir therebetween, an inclined connection formed jointly on the upper end of the casing and shell respectively for moving the shell along the casing upon relative rotation therebetween, a closure wall carried by the lower part of said shell and having an annular valve surface formed coaxially around a central orifice therein so as to coact with said valve seat in controlling the flow of the liquid from the reservoir onto a specimen slide, and venting means operably constructed so as to be responsive to relative rotation between said shell and casing for closing the venting means previous to the seating of the annular valve surface on said valve seat whereby a quantity of oil is forcibly ejected therethrough concurrently with the valve closing action.

References Cited by the Examiner

UNITED STATES PATENTS 2,252,543   8/41   Beeh _____ 222—501
2,764,061   9/56   Kinder et al. _____ 88—39

JEWEL H. PEDERSEN, *Primary Examiner.*